United States Patent [19]

Higashi et al.

[11] Patent Number: 4,739,657

[45] Date of Patent: Apr. 26, 1988

[54] RESISTANCE WITH LINEAR TEMPERATURE COEFFICIENT

[75] Inventors: Robert E. Higashi, Shorewood; Robert G. Johnson, Minnetonka, both of Minn.

[73] Assignee: Honeywell Inc., Minneapolis, Minn.

[21] Appl. No.: 65,205

[22] Filed: Jun. 22, 1987

[51] Int. Cl.⁴ .............................................. G01F 1/68
[52] U.S. Cl. ...................................................... 73/204
[58] Field of Search ........................................ 73/204

[56] References Cited

U.S. PATENT DOCUMENTS

| | | | |
|---|---|---|---|
| 4,279,146 | 7/1981 | Wessel et al. | 73/204 |
| 4,344,322 | 8/1982 | Plapp | 73/204 |
| 4,478,076 | 10/1984 | Bohrer | 73/204 |
| 4,561,303 | 12/1985 | McCarthy | 73/204 |

Primary Examiner—Herbert Goldstein
Attorney, Agent, or Firm—Omund R. Dahle

[57] ABSTRACT

The sensors and heater of a microbridge flow sensor are each compensated for non-linear curvature of the resistance versus temperature curve by the use of a section of permalloy in series with a section of platinum thin film resistor. The platinum exhibits non-linearity in one direction and the permalloy exhibits non-linearity in the opposite direction.

11 Claims, 5 Drawing Sheets

RESISTANCE WITH LINEAR TEMPERATURE COEFFICIENT

BACKGROUND AND SUMMARY OF THE INVENTION

The present invention relates to the field of air flow or velocity sensors and particularly to microbridge air flow sensors. Many air velocity sensors that are commercially available are commonly of the single hot wire or thermistor type and are typically mounted on the end of a long probe for insertion into the air stream. In the more recent prior art has been described a microbridge flow sensor comprising a pair of thin film heat sensors and a thin film heater. These semiconductor chip sensors are described in patents such as U.S. Pat. Nos. 4,472,239, 4,478,076, 4,478,077, 4,501,144, 4,548,078, 4,581,928 4,624,137, and 4,651,564 all assigned to the assignee of the present invention.

One example of this microbridge flow sensor prior art is shown herein in FIGS. 1, 2, 3, 4 and 5 taken from U.S. Pat. No. 4,501,144. The prior art invention shown comprises a pair of thin film heat sensors 22 and 24, a thin film heater 26 and a base 20 supporting the sensors and heater out of contact with the base. Sensors 22 and 24 are disposed on opposite sides of heater 26. Body 20 is a semiconductor, preferably silicon, chosen because of its adaptability to precision etching techniques and ease of electronic chip producibility. The embodiment includes two identical temperature sensing resistor grids 22 and 24 acting as the thin film heat sensors and a centrally located heater resistor grid 26 acting as the thin film heater. Sensors 22 and 24 and heater 26 are preferably fabricated of nickel-iron, herein sometimes referred to as permalloy, having a preferred composition of 80 percent nickel and 20 percent iron. The sensor and heater grids are encapsulated in a thin film of dielectric, typically comprising layers 28 and 29 and preferably silicon nitride, to form thin film members. In the embodiment shown in FIGS. 1 and 2, the sensor comprises two thin film members 32 and 34, member 32 comprising sensor 22 and member 34 comprising sensor 24, each member comprising one-half of heater 26 and having a preferred dimension of 150 microns wide and 400 microns long.

The embodiment of the prior art sensor further comprises an accurately defined air space 30 which results in air space effectively surrounding elements 22, 24 and 26. The effectively surrounding air space is achieved by fabricating the structure on silicon surface 36, thin film elements 22, 24 and 26 having a preferred thickness of approximately 0.08 to 0.12 micron with lines on the order of 5 microns wide and spaces between lines on the order of 5 microns, the elements encapsulated in a thin silicon nitride film preferably having a total thickness of approximately 0.8 microns or less, and by subsequently etching an accurately defined air space, preferably 125 microns deep, into silicon body 20 beneath members 32 and 34.

Members 32 and 34 connect to top surface 36 of semiconductor body 20 at one or more edges of depression or air space 30. As illustrated in FIG. 3, members 32 and 34 may be bridged across depression 30; alternately, for example, members 32 and 34 could be cantilevered over depression 30.

Silicon nitride is a highly effective solid thermal insulator. Because the connecting silicon nitride film within members 32 and 34 is exceedingly thin and a good insulator, it contributes very little to the loss of heat from heater 26, and nearly all the heat conducted from heater resistor 26 to sensing resistors 22 and 24 is conducted through air surrounding heater 26. Moreover, the supporting silicon nitride film has such a low thermal conductivity that sensing resistor grids 22 and 24 can be located immediately adjacent to heating resistor grid 26 and yet can allow most of the heat conducted to sensing resistor 22 and 24 from heater resistor 26 to pass through the surrounding air rather than through the supporting nitride film. Thus, sensing resistor grids 22 and 24 are in effect suspended rigidly in the air space near heater resistor 26 and act as thermal probes to measure the temperature of the air near and in the plane of heater resistor grid 26.

The operation of the prior art invention in sensing air flow can be described with reference to FIG. 2. Heater resistor grid 26 operates at a preferred constant average temperature difference of 200 degrees Centigrade elevated above the temperature of silicon chip 20. The power required by heater resistor 26 to achieve 200 degrees Centigrade above ambient temperature is very small, being less than 0.010 watt.

In the prior art embodiment at zero air flow velocity, thermal conduction from heater resistor grid 26, largely through the surrounding air space including air space 30, heats identical temperature sensing resistor grids 22 and 24 to an average temperature of about 140 degrees Centigrade or about 70 percent of the temperature elevation of heater element 26. In the embodiment illustrated, sensor grids 22 and 24 are precisely symmetrically located with respect to heater grid 26 so that at zero air flow they have identical temperatures and have no differences between their resistances.

With air flow present, upstream resistor sensor 22 will be cooled by the transportation of heat away from sensor 22 toward heater resistor grid 26, whereas downstream sensor 24 will be heated by transportation of heat toward the sensor from heat resistor grid 26. Consequently, a resistance difference between sensor resistances 22 and 24 will be present with a corresponding difference in voltage drop which is a measure of the air flow. Typical unamplified voltage differences can be as high as 0.1 volt at a 1500 feet per minute flow velocity.

Because of the exceedingly small thermal mass of the heater and sensor element structure and the thermal insulation provided by the thin silicon nitride connecting means to the supporting silicon body, and because of the surrounding air space, response time of the present sensor is very short, with response time constants of 0.005 second having been measured. Consequently, sensor elements 22 and 24 can respond very rapidly to air flow changes.

In the operation of the prior art sensor, heater 26 is operated at a constant temperature above ambient temperature, sensors 22 and 24 being operated at constant current, and the changing temperatures of sensors 22 and 24 are sensed as changes in resistance. Typical circuits for accomplishing these functions are illustrated in FIGS. 4 and 5.

The heater control circuit illustrated in FIGS. 4 uses a wheatstone bridge 46 to maintain heater 26 at a constant temperature rise above ambient as sensed by heat sunk reference resistor 38. As previously indicated, the constant temperature rise above ambient is preferably set at approximately 200 degrees Centigrade. Wheatstone bridge 46 is shown comprising heater resistor 26 and a resistor 40 in its first leg and a resistor 42, heat sunk resistor 38, and a resistor 44 in its second leg. An error integrator comprising amplifiers 48 and 50 keeps bridge 46 balanced by varying the potential across it and thus the power dissipated in heater resistors 26.

The circuitry of FIG. 5 monitors the resistance difference between downstream sensor 24 and upstream sensor 22. This circuitry includes a constant current source 52 comprising an amplifier 72 and a differential amplifier 54 comprising amplifiers 68 and 70. The constant current source drives a wheatstone bridge comprising two high impedance resistors 56 and 58 in one leg and the two sensing resistors 22 and 24 with a nulling potentiometer 60 in the other leg. The gain of differential amplifier 54 is adjusted by potentiometer 62. Output 64 provides an output voltage that is proportional to the resistance difference between the two sensing resistors 22 and 24.

One of the successful materials used in thin film layer fabrication for the sensors and heater is the nickel-iron material sometimes referred to as permalloy, having a preferred composition of 80% nickel and 20% iron. Permalloy thin film when laminated within a silicon nitride member is protected from oxidation by air and can be used as a heating element to temperatures in excess of 400 degrees Centigrade. Such a permalloy element has a thermal coefficient of resistance (TCR) of about 4000 parts per million at zero degrees Centigrade.

When extreme linearity of resistance versus temperature is a requirement it has been found that a problem occurs with the use of permalloy. FIG. 6 is a graphical representation of output versus mass flow and it illustrates the lack of accurate mass flow measurement that is obtained at different temperatures with a permalloy air flow sensor. In FIG. 6 the x-axis is mass flow in standard cubic centimeters per minute. At higher temperatures, the same mass flow gives a larger response except for low flow rates where the curves coincide. FIG. 7 is a graphical representation of a resistance versus temperature curve for permalloy. It can be seen from the curve that at two points on the curve where $\Delta R_1 = \Delta R_2$ then $\Delta T_1 < \Delta T_2$ because of the nonlinearity of the TCR.

The nonlinearity, as illustrated in FIG. 7, affects the measured mass flow in two ways: (1) through the heater, and (2) through the detectors. With the heater, the circuit keeps the heater resistance difference constant (relative to an ambient sensing reference resistor) when the ambient temperature changes. Consequently, at higher temperatures, because the R vs. T curve has a steeper slope, the same resistance difference results in a smaller heater temperature differential with respect to the ambient, and this tends to reduce the voltage output response. With the detectors, however, the steeper R vs. T curve at higher ambients increases the detector resistance differences, and so increases the output signal for any given mass flow. These two effects tend to cancel at low flows, but the detector effect dominates at high flows, yielding the responses shown in the attached FIG. 6.

In the invention taught herein it is clear that a linear TCR structure is needed in which material can also be fabricated as thin film resistor and sensor. It has been discovered that by combining a small permalloy length of resistor film with a long length of platinum film in series, a very linear TCR characteristic can be obtained and an accurate mass flow measurement becomes possible. The use of a hybrid combination of permalloy and platinum yields a first order correction to bring the family of curves of FIG. 6 together at high flows as well as at low flows.

DESCRIPTION

Figure 8:
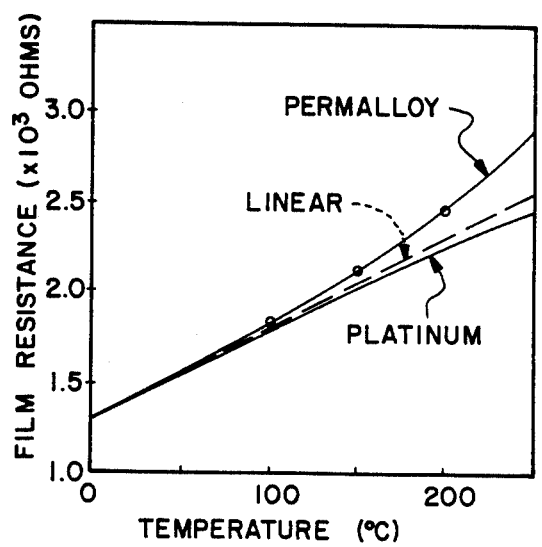
FIG. 8 is a graphical representation of the TCR curves of permalloy and platinum.

FIG. 8 shows graphically the behavior of R vs. T curves for permalloy and platinum, permalloy curving up and platinum curving down. These curves can be represented by quadratic expressions with satisfactory accuracy, and by combining the right platinum resistance with the right amount of permalloy resistance, the upward curvature can be made to cancel the downward curvature of the platinum. The resistance values can be calculated as follows.

The total resistance for a length of platinum film in series with a length of permalloy film can be represented by the expression:

$$R = N_p R_p(1 + a_1 T - b_1 T^2) + N_m R_m(1 + a_2 T + b_2 T^2)$$

where R is total resistance, Np is the number of squares of platinum, Rp is the resistance per square, $a_1$ is the linear coefficient, T is the difference between the temperature point being considered and a reference temperature, $b_1$ is the quadratic coefficient, and the remaining corresponding terms apply to permalloy. For R to be linear in T, the squared terms in this equation must add to zero:

$$-N_p R_p b_1 T^2 + N_m R_m b_2 T^2 = 0$$

from which the ratio of numbers of squares of resistance can be obtained:

$$-N_m/N_p = (R_p b_1)/(R_m b_2)$$

Figure 9:
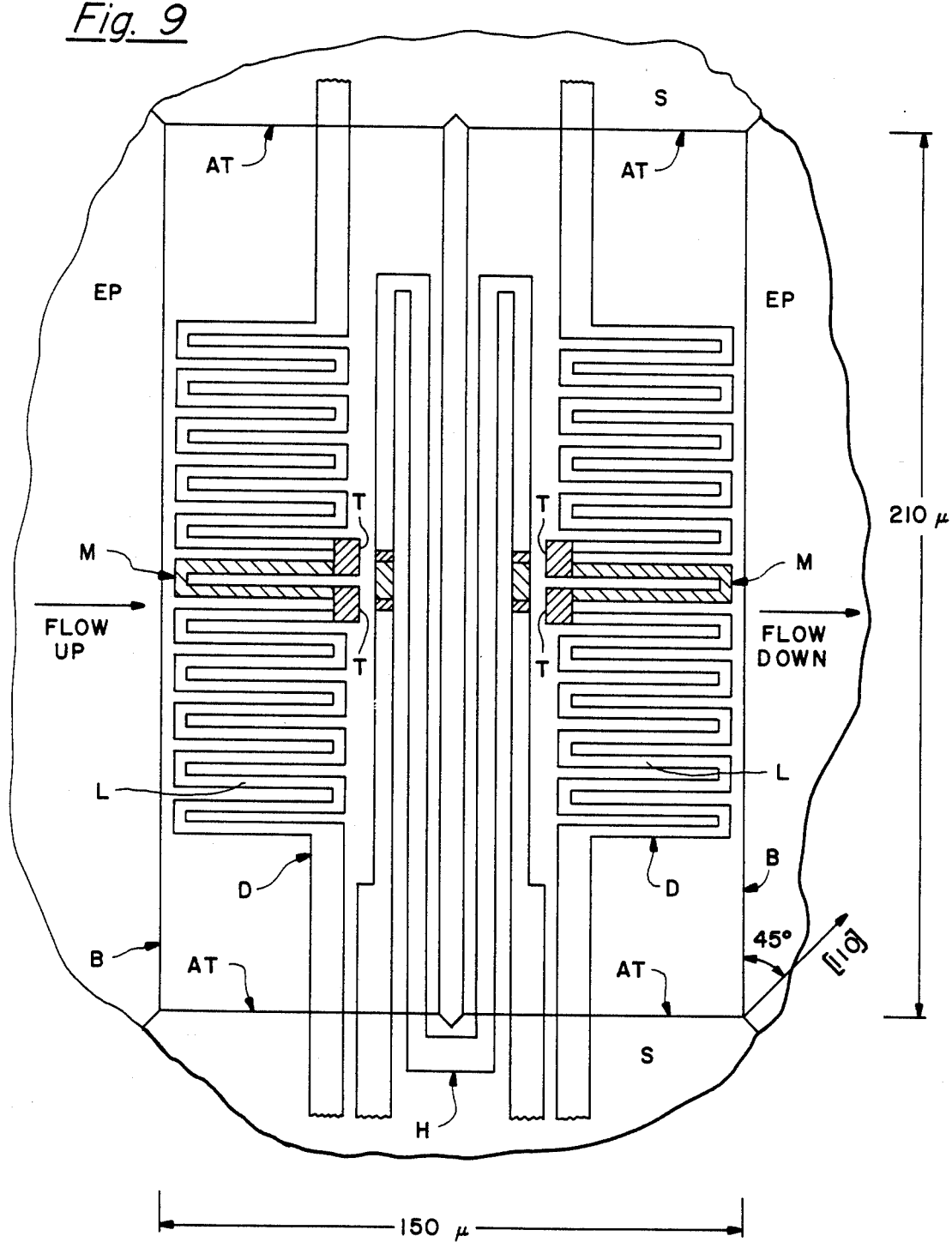
FIG. 9 is a top plan view of the microbridge flow sensor.

Using experimental values of $R_p = 4.2$, $R_m = 3.0$, $b_1 = 0.2 \times 10^{-6}$, $b_2 = 4.3 \times 10^{-6}$, the ratio of squares is found to be: $N_m/N_p = 0.065$ Next, to show the combination of permalloy and platinum resistances in a microbridge air flow sensor, reference is made to FIG. 9. This is a top plan view of the general type of microbridge sensor disclosed in the earlier cited patents, modified to include the invention. It broadly consists of two microbridges, B, suspended over an etch pit, EP, in the silicon substrate, S, and having laminated within the bridges a platinum and permalloy heater, H, and two flanking symmetrical dectector resistors, D. The microbridges are attached to the silicon chip at the edges of the etch pits at edges, AT. The detector resistances consist largely of platinum film about 500 angstroms thick (dotted) with short lengths of permalloy, M, (hatched) connected in the middle of each platinum length of film. The permalloy is about 800 angstroms thick. The microbridges are about five mils wide, about 15 mils long, and detector lines are about three microns wide, with the permalloy width being adjusted to give the calculated 0.065 required ratio for the number of squares. As shown in FIG. 9, a single loop of permalloy with its upwardly-curving response compensates for the smaller downward curving response of the platinum. At the junctions of the dissimilar conductive metals platinum and permalloy, thermocouples T exist both at the sensors M and at the heater H. The permalloy M is placed at the center where flow and temperature is most uniform so thermocouple voltages will tend to cancel each other.

Figure 1:
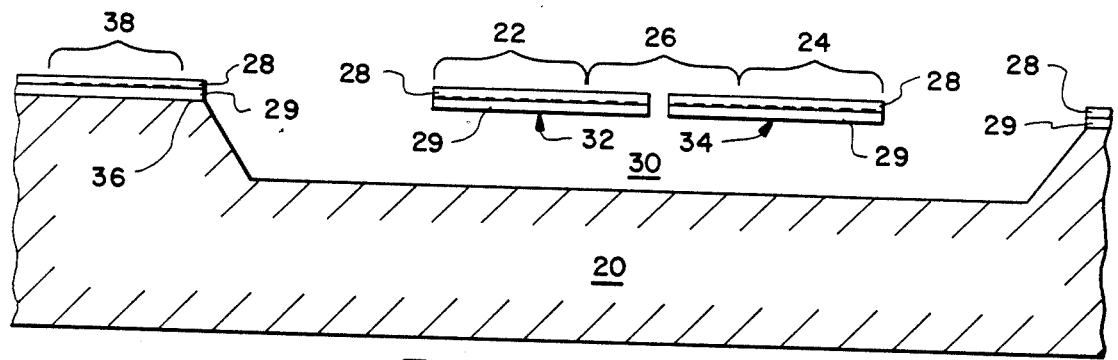
FIGS. 1, 2 and 3 are different views of a prior art embodiment of a microbridge flow sensor.
Figure 2:
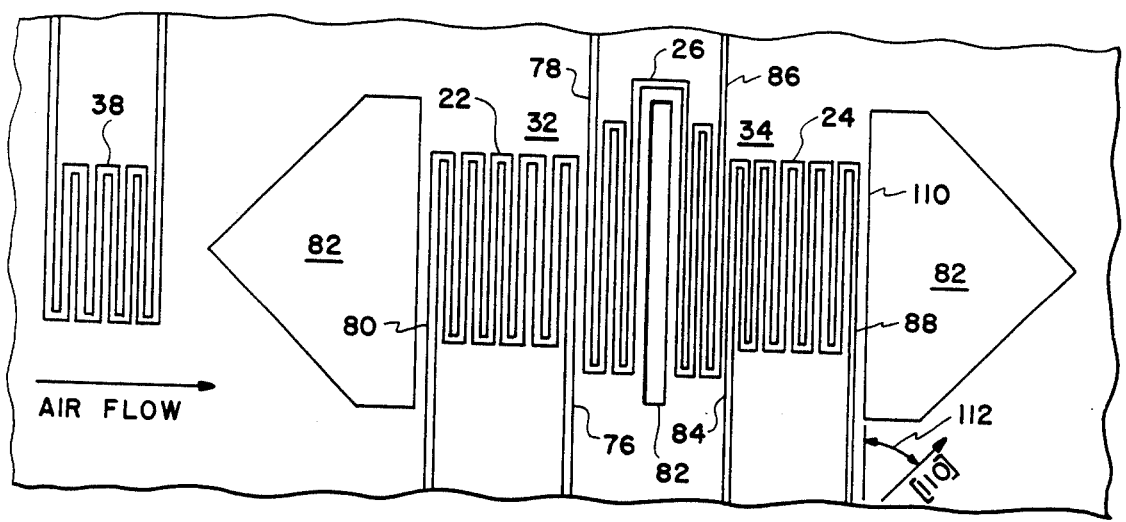
Figure 3:
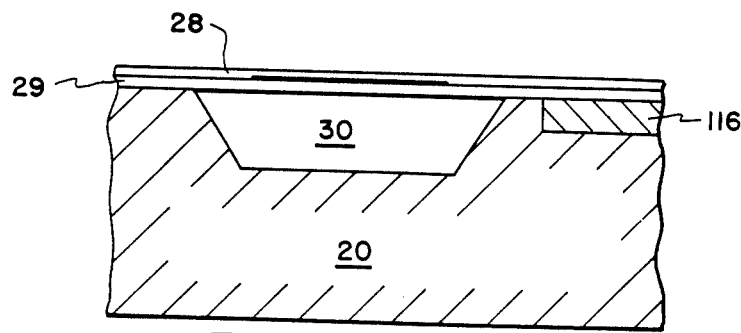
Figure 4:
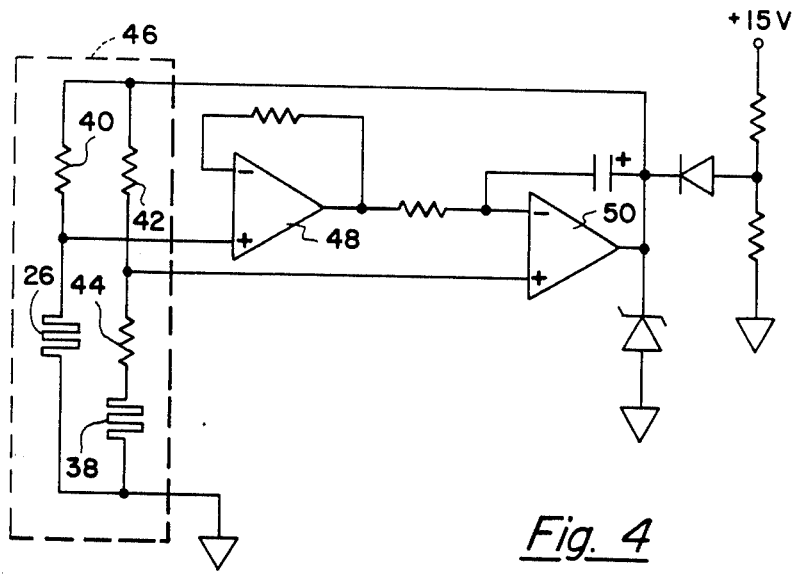
FIGS. 4 and 5 are typical circuts for use with the sensors of FIGS. 1-3.
Figure 5:
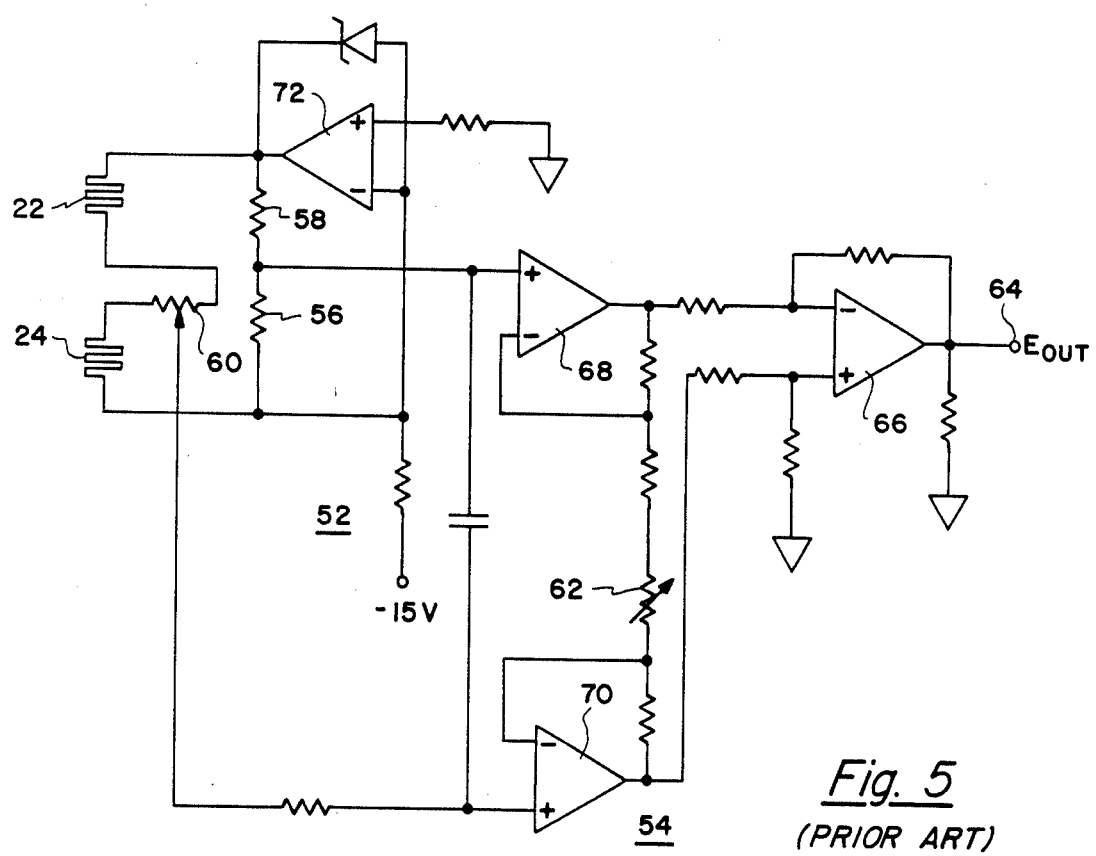
Figure 6:
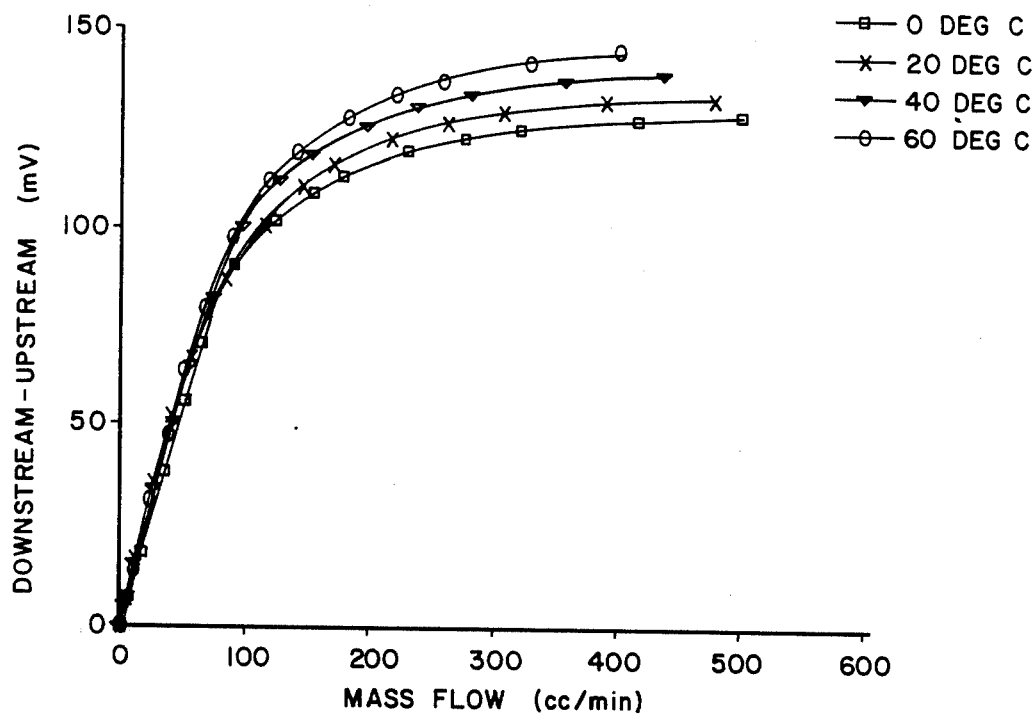
FIG. 6 is a graphical representation of output versus mass flow of permalloy.
Figure 7:
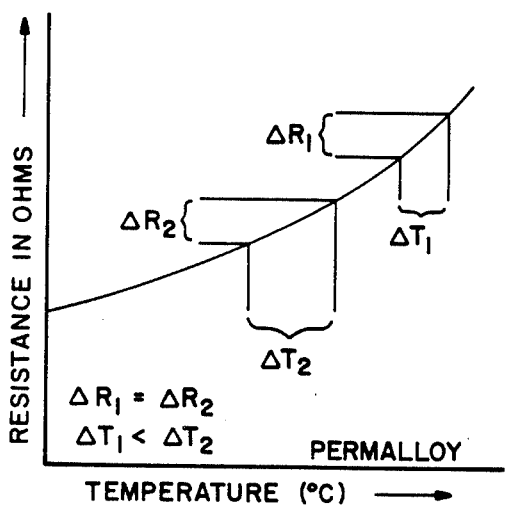
FIG. 7 is a graphical representation of resistance versus temperature for permalloy.

Referring in more detail to the construction of the loops of the detector resistors D in this invention, the monocrystalline silicon substrate S has first deposited on its surface a layer (typically 0.4 micron) of silicon nitride (like layer 29 shown in FIGS. 1 and 3). A layer of permalloy, for example 800 angstroms thick, is formed over the silicon nitride surface; a photomask is deposited and the unwanted permalloy is ion milled away leaving the permalloy loop M&M' in the detectors D and the heater H. A layer of platinum, for example 500 angstroms thick, is then provided over the silicon nitride surface; a photomask is formed and the unwanted platinum is ion milled away to form the remainder of the heater and detector resistance. At the portions T, where the platinum loop overlaps and joins the permalloy loop, there are formed thermocouples by the dissimilar metals. Another thin film of silicon nitride covers the metals to laminate the detectors and heater within.

The design layout of the continuous sinuous or serpentine resistive detector path is such as to orient the plurality of parallel legs a, b, c, d, e, f, g, etc. into a boustrophedonic like pattern in which a first leg "a" preceeds from left-to-right and the succeeding parallel leg b proceeds from right-to-left. The long direction of the parallel legs is orthogonal to the long direction of the microbridges B. Since the heater H is formed longitudinally at the inner edge of the microbridge, the lateral thermal gradient is also orthogonal to the heater so that the legs are parallel with the thermal gradient. This is important since not all parts of the microbridge are at the same temperature, one wants to have like portions of both types of metals see the same temperature. Only with the orthogonally oriented resistive path can this occur. In this air flow sensor the air flow direction is also parallel to the detector resistive long loops as shown.

Although the chosen descriptive words sinuous or serpentine may normally suggest a thin film resistance with curved portions joining the parallel long loops, the actual preferred shape as shown in FIG. 9 is more nearly that normally associated with a square-wave designation.

The airflow direction is shown from left to right in FIG. 9. The detector resistance loops L are oriented parallel to the air flow, that is orthogonally to the direction of the resistance loops in the assignees earlier patents, cited, because in the present invention the best design requires that the permalloy experience the same type of temperature changes under flow that the platinum experiences. Also this design places the platinum/permalloy junctions at the same temperature on each respective resistor so that there will be no resultant thermocouple generated voltage to complicate the output. Thus, the end result of this structure is that the up-curve of the permalloy TCR is compensated by the down-curve of the platinum to yield a linear response over a wide temperature range. In FIG. 9 the bridge is shown as being oriented at an angle of 45° with respect to the <110> direction of the silicon crystal, however, this orientation is not a part of the invention and is not essential to the invention.

Figure 10:
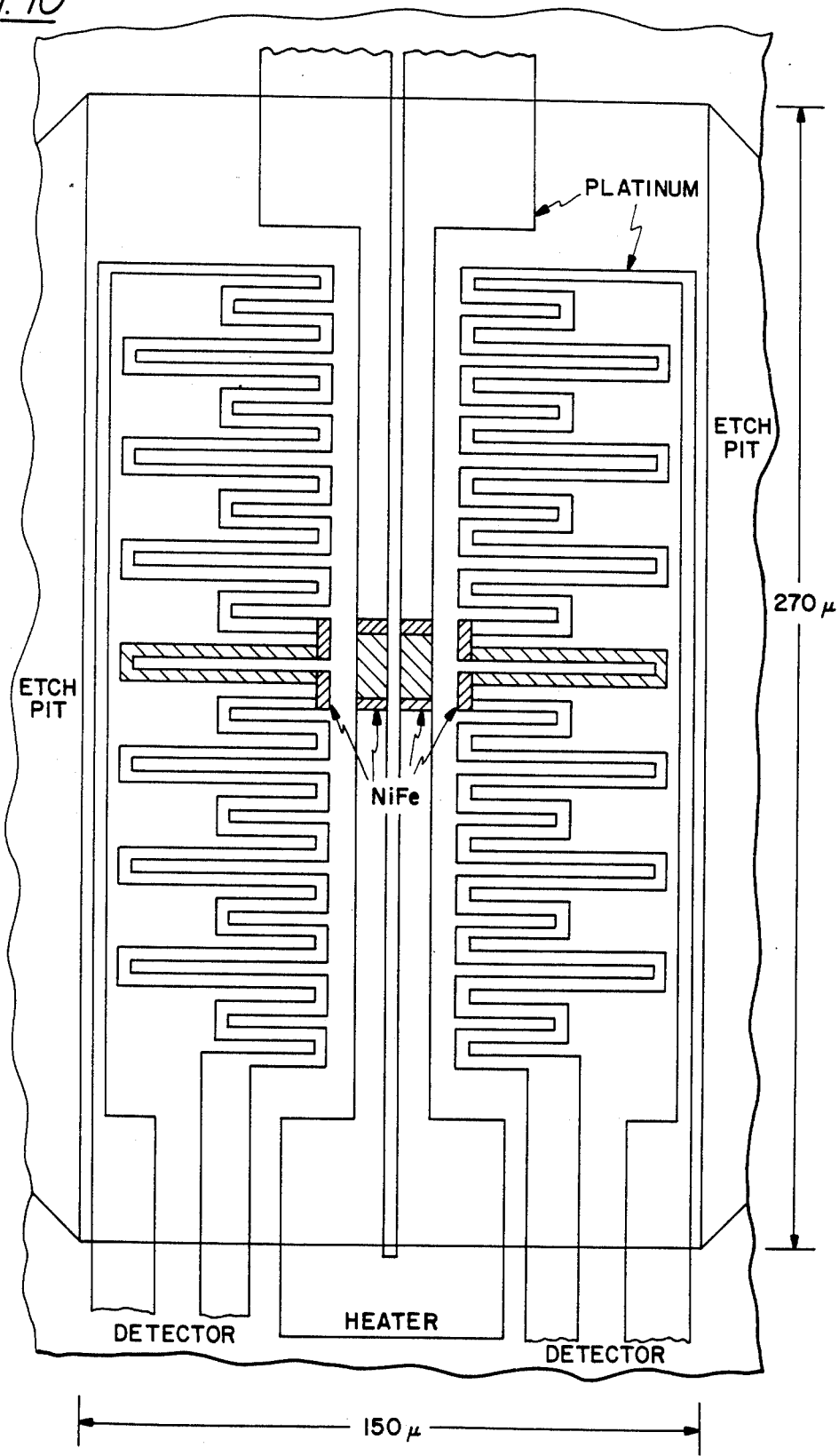
FIG. 10 is a modification of FIG. 9.

FIG. 10 is a modification of FIG. 9. To achieve a steeper slope for the response at the top end of the range, the modification of FIG. 10 is used in which about half of the resistance loops in the detector line are shortened to delay a larger part of the cooling effect of the flow to higher velocities and thus steepen the normalized response curve.

The embodiments of the invention in which an exclusive property or right is claimed are defined as follows:

1. A microbridge flow sensor, comprising:
   thin film dielectric bridge means having a main direction suspended over a depression in a semiconductor substrate surface;
   a thin film heater encapsulated in said thin film dielectric for heating sensors; said heater being oriented along said main direction;
   a pair of thin film resistive sensors flanking said heater on said bridge means, each of said thin film resistive sensors comprising in series a first portion and a linearity compensating portion, said first portion comprising thin film platinum and said compensating portion comprising thin film permalloy, the temperature coefficient of resistance of platinum exhibiting a non-linearity in one direction and the temperature coefficient of resistance of permalloy exhibiting a non-linearity in the other direction whereby a substantially linear temperature coefficient of resistance can be achieved.

2. The invention according to claim 1 in which said film resistive sensors are each fabricated in a continuous serpentine path comprising a series of closely spaced parallel long loop portions, said parallel long loop portions being oriented orthogonally to said thin film heater.

3. The invention according to claim 2 in which the major portion of said thin film heater length is of platinum and a minor portion intermediate the platinum sections is of permalloy, said platinum being subject to a temperature coefficient of resistance (TCR) exhibiting a non-linearity in one direction, said permalloy being subject to a TCR exhibiting a non-linearity in the opposite direction whereby a linear TCR can be achieved in the heater.

4. The invention according to claim 1 in which said bridge means comprises first and second side-by-side bridges, said bridges each having a portion of said heater thereon and each having thereon one of said pair of thin film resistive sensors.

5. The invention according to claim 2 in which the major portion of each resistive sensor length is the platinum and a minor portion is the permalloy.

6. A microbridge flow sensor, comprising:
   thin film dielectric bridge means having a main direction suspended over a depression in a semiconductor substrate surface;
   a thin film heater encapsulated in said thin film dielectric bridge means for heating sensors; said heater being oriented along said main direction;
   a pair of thin film resistive sensors encapsulated in said thin film dielectric and straddling said heater on said bridge means, each of said thin film resistive sensors comprising in series a first type and a linearity compensating type, said first type comprising thin film platinum and said compensating type comprising thin film permalloy, the temperature coefficient of platinum exhibiting a non-linearity in one direction and the temperature coefficient of permalloy exhibiting a non-linearity in the other direction whereby a linear temperature coefficient can be achieved, said pair of thin film resistive sensors each being oriented to form a boustrophedonic shaped sinuous path comprising a plurality of parallel long loops, the long direction of the long loops being orthogonal to said main direction.

7. The invention according to claim 6 in which the major portion of said thin film heater length is of platinum and a minor portion intermediate the platinum sections is of permalloy, said platinum being subject to a temperature coefficient of resistance (TCR) exhibiting a non-linearity in one direction, said permalloy being subject to a TCR exhibiting a non-linearity in the opposite direction whereby a linear TCR can be achieved in the heater.

8. A temperature coefficient linearizing sensor device for microbridge flow sensor, comprising:
   a first thin film resistive sensor comprising a sinuous shaped thin film layer of platinum, said platinum being subject to a temperature coefficient of resistance (TCR) exhibiting a non-linearity in one direction, said resistive sensor also comprising in series with said platinum a sinuous thin film layer of permalloy, said permalloy being subject to a TCR exhibiting a non-linearity in the opposite direction;
   a second thin film resistive sensor like the first;
   said first and second thin film resistive sensors formed on opposite halves of a microbridge dielectric bridge means which is suspended over a depression formed in a monocrystaline semiconductor substrate surface; and,
   a thin film heater formed lengthwise on said dielectric bridge between said first and second sensors for the purpose of heating said sensors.

9. A temperature coefficient linearizing sensor device for a microbridge flow sensor, comprising:
   a thin film heater formed lengthwise on a dielectric microbridge which is suspended over a depression in the surface of a monocrystalline semiconductor substrate;
   a first thin film resistive sensor comprising a boustrophedonic shaped thin film path of platinum, said platinum being subject to a temperature coefficient of resistance (TCR) exhibiting a nonlinearity in one direction, said resistive sensor also comprising interposed in the center of said platinum layer in series with said platinum a boustrophedonic thin film path of permalloy, said permalloy being subject to a TCR exhibiting a nonlinearity in the opposite direction, such boustrophedonic path including closely spaced parallel long loop portions;
   a second thin film resistive sensor like the first;
   said first and second thin film resistive sensors formed on opposite sides of said heater on said microbridge, said long loop portions being oriented orthogonally to said thin film heater.

10. The sensor device according to claim 9 in which said first and second thin film resistive sensors having the boustrophedonic path of closely spaced parallel long loop portions further comprises some of said long loop portions being foreshortened with respect to the others to delay a larger part of the cooling effect of the flow to higher velocities and thus adjust and steepen the normalized response curve at the high end.

11. The sensor according to claim 2 in which said thin film resistive sensors each fabricated in a continuous serpentine path comprising a series of closely spaced parallel long loop portions further includes some of said long loop portions being foreshortened with respect to the others to delay a larger part of the cooling effect of the flow to higher velocities and thus adjust and steepen the normalized response curve at the high end.

* * * * *